United States Patent [19]
Chang

[11] Patent Number: 6,086,426
[45] Date of Patent: Jul. 11, 2000

[54] ELECTRICAL CONNECTOR

[75] Inventor: Yao-Hao Chang, Chung-Ho, Taiwan

[73] Assignee: Hon Hai Precision Ind. Co., Ltd., Taiepi Hsien, Taiwan

[21] Appl. No.: 09/261,946

[22] Filed: Mar. 3, 1999

[30] Foreign Application Priority Data

Mar. 3, 1998 [TW] Taiwan .................................. 87203132

[51] Int. Cl.[7] .................................................. H01R 23/70
[52] U.S. Cl. ........................................... 439/630; 439/188
[58] Field of Search .................................... 439/630, 260, 439/267, 73, 325, 188

[56] References Cited

U.S. PATENT DOCUMENTS

| | | | |
|---|---|---|---|
| 5,013,255 | 5/1991 | Juret et al. | 439/260 |
| 5,275,573 | 1/1994 | McCleerey | 439/159 |
| 5,330,363 | 7/1994 | Gardener et al. | 439/188 |
| 5,667,397 | 9/1997 | Broschard, III et al. | 439/188 |
| 5,807,124 | 9/1998 | Bricaud et al. | 439/188 |
| 5,823,828 | 10/1998 | Bricaud et al. | 439/360 |

*Primary Examiner*—Khiem Nguyen
*Assistant Examiner*—Son V. Nguyen
*Attorney, Agent, or Firm*—Wei Te Chung

[57] ABSTRACT

An electrical connector for electrical interconnection between a card apparatus and a circuit board comprises a base having a top surface for supporting the card apparatus. The base defines a plurality of terminal cells therein. Two side walls are formed on opposite ends thereof defining a receiving space therebetween. A plurality of terminals is assembled in the corresponding terminal cell. Each terminal has a connecting arm protruding into the receiving space for electrically connecting a corresponding conductive pad of the inserted card apparatus. A pair of panels is assembled to the corresponding side walls and each includes guiding and retaining panels attached the side walls of the base such that the guiding panel extends apart from a top end of the side wall to a predetermined distance. A guiding slot between the guiding panel and the supporting face for retaining the card apparatus therebetween thereby achieving a reduced thickness of the connector.

6 Claims, 4 Drawing Sheets

6,086,426

ELECTRICAL CONNECTOR

FIELD OF THE INVENTION

The present invention relates to an electrical connector, and more particularly to a low profile electrical connector.

DESCRIPTION OF THE PRIOR ARTS

Compact design is a trend of notebook computer industry, all components used with the notebook must meet this requirements. As shown in FIG. 4, U.S. Pat. No. 5,380,997 discloses a card connector including a housing 71 which defines a plurality of passageways 72 to receive terminals therein. A frame 73 is assembled to the housing 71 thereby defining a space to receive an inserted memory card 6 therein whereby contacts of the card 6 are electrically connected with the terminals. However, the height of the connector is too high to meet the compact design of the notebook computer. According the existing practice, both the frame 73 and the housing 71 are made through injection mold thereby rendering a minimum thickness of the plastic article. If the thickness of the article is lower than that minimum, the plastic article tends to break apart. Accordingly, the thickness of the frame and the housing have to meet the minimum thickness thereby rendering a bulky dimension of the existing memory card.

In addition, the existing card connector comprises a switch which is triggered on when the memory card is fully inserted. The existing switch is mounted on an end wall opposite an insert direction of the memory card. As the trigger of the switch is parallel to the insertion direction of the memory card, a front edge of the inserted memory card will not in contact with the trigger even contacts of the memory card have electrically engaged with terminals of the connector thereby rendering the memory card unworkable. U.S. Pat. Nos. 4,735,578, 4,900,272, 5,013,255 and 5,370,544 describe such card connectors.

SUMMARY OF THE INVENTION

An objective of this invention is to provide a low profile electrical connector having guiding means for ensuring electrical connection to an inserted memory card.

Another objective of this invention is to provide a low profile connector having a switch located in a plane such that the switch can be effectively triggered during insertion of a memory card.

In order to achieve the objectives set forth, an electrical connector for electrical interconnection between a card apparatus and a circuit board in accordance with the present invention comprises a base having a top surface for supporting the card apparatus. The base defines a plurality of terminal cells therein. Two side walls are formed on opposite ends thereof defining a receiving space therebetween. A plurality of terminals is assembled in the corresponding terminal cell. Each terminal has a connecting arm protruding into the receiving space for electrically connecting a corresponding conductive pad of the inserted card apparatus. A pair of panels is assembled to the corresponding side walls and each includes guiding and retaining panels attached the side walls of the base such that the guiding panel extends apart from a top end of the side wall to a predetermined distance. A guiding slot between the guiding panel and the supporting face for retaining the card apparatus therebetween thereby achieving a reduced thickness of the connector.

These and additional objects, features, and advantages of the present invention will become apparent after reading the following detailed description of the preferred embodiments of the invention taken in conjunction with the appended drawing.

DETAILED DESCRIPTION OF PREFERRED EMBODIMENT

Figure 1:
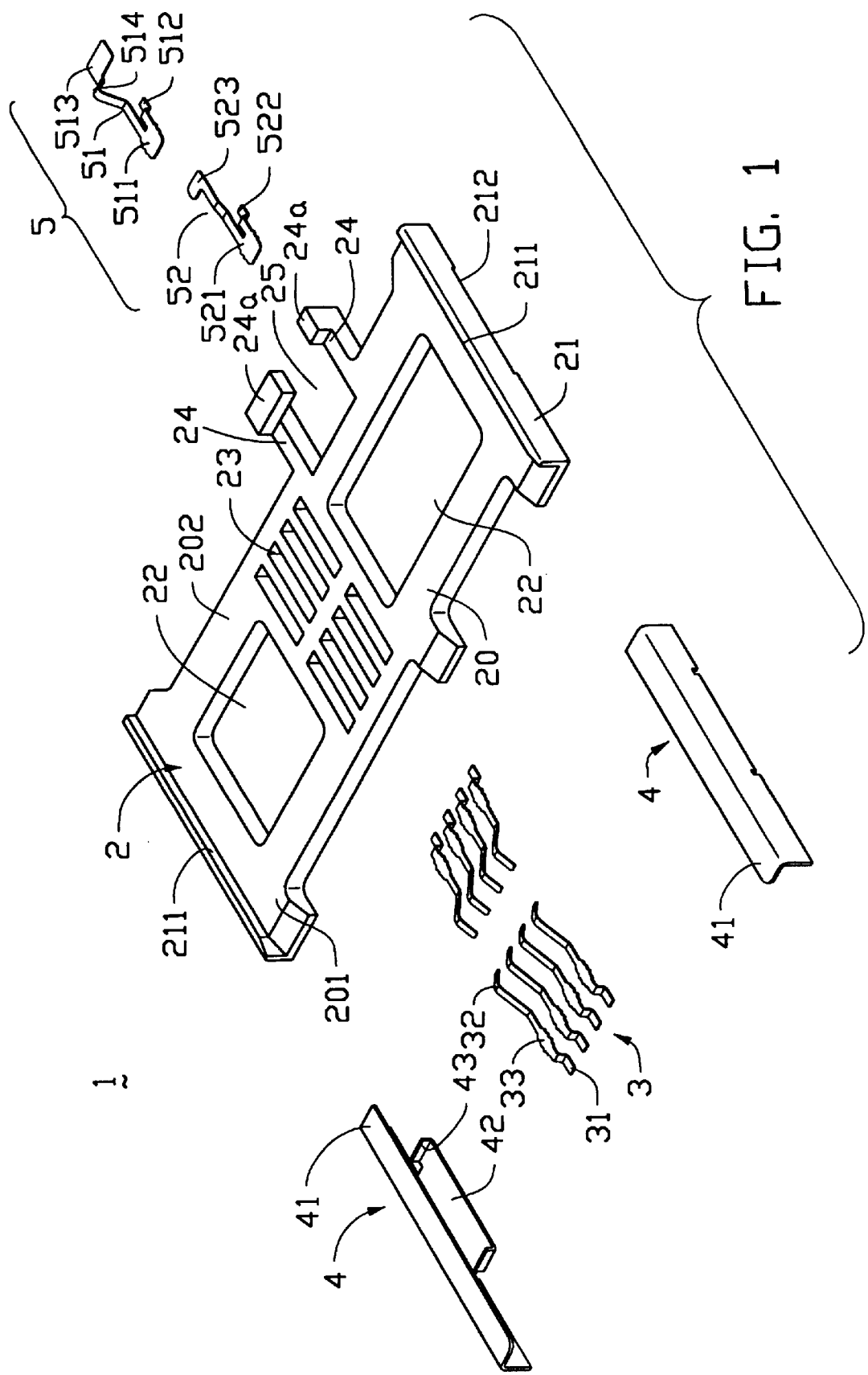
FIG. 1 is a perspective view of an electrical connector in accordance with the present invention.
Figure 2:
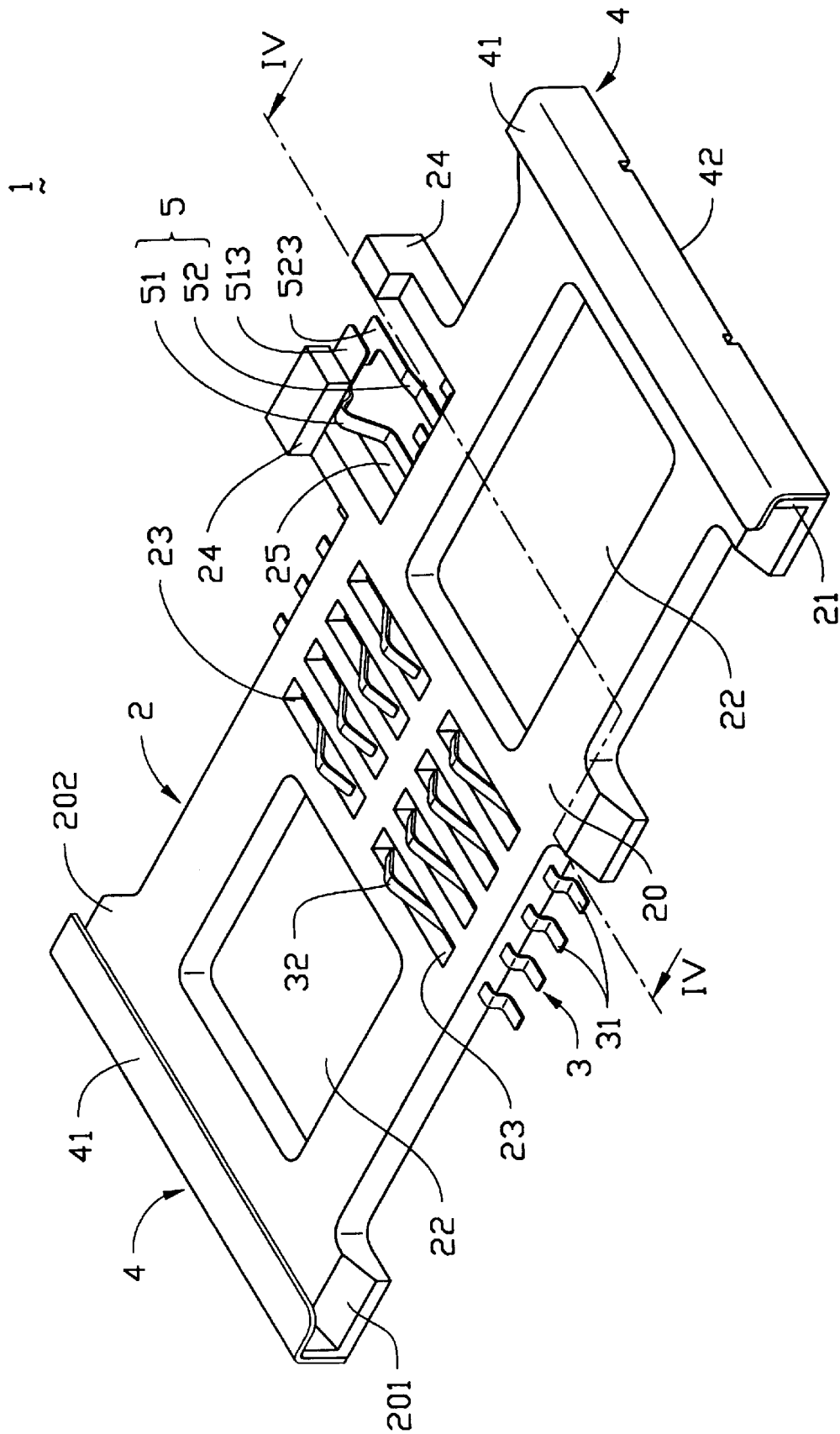
FIG. 2 is an assembled view of FIG. 1.
Figure 3A:
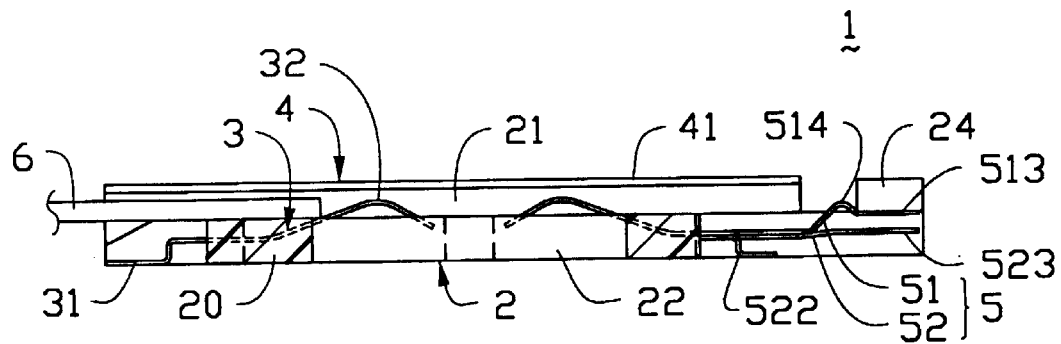
FIGS. 3A to 3D are cross sectional views showing a memory card is inserting to the electrical connector.
Figure 3B:
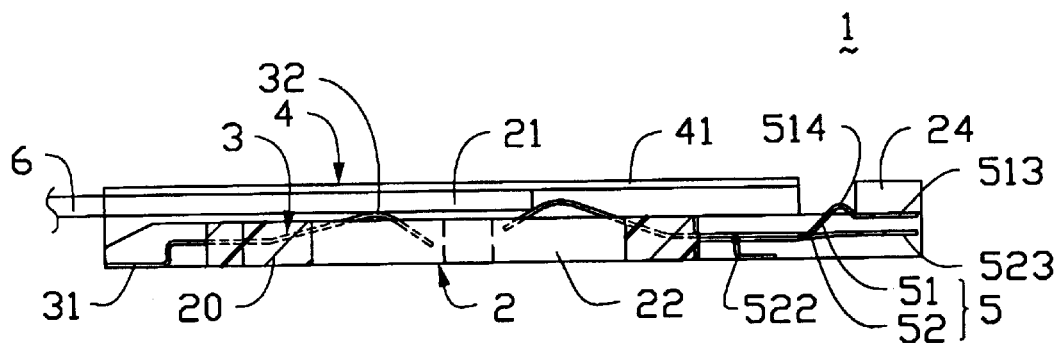
Figure 3C:
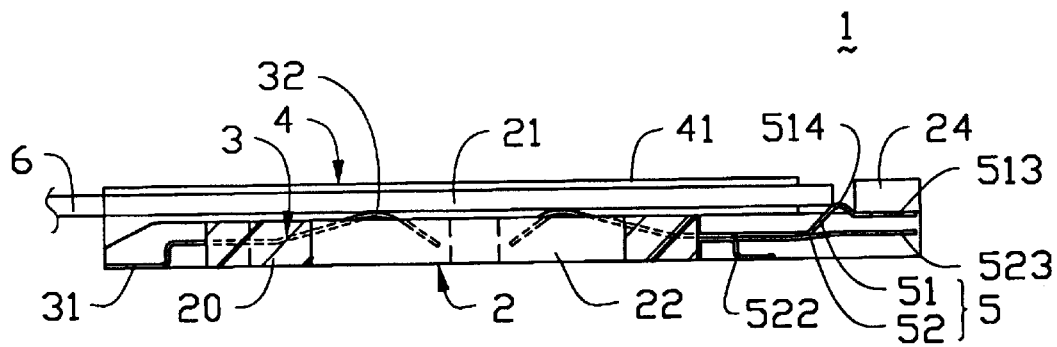
Figure 3D:
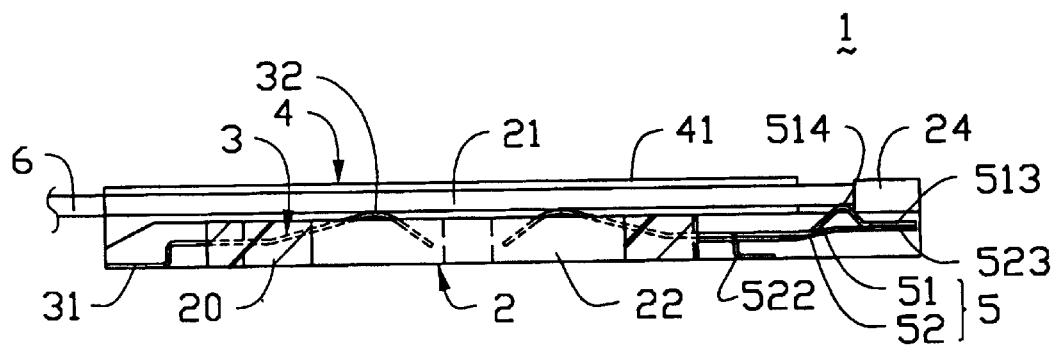
Figure 4:
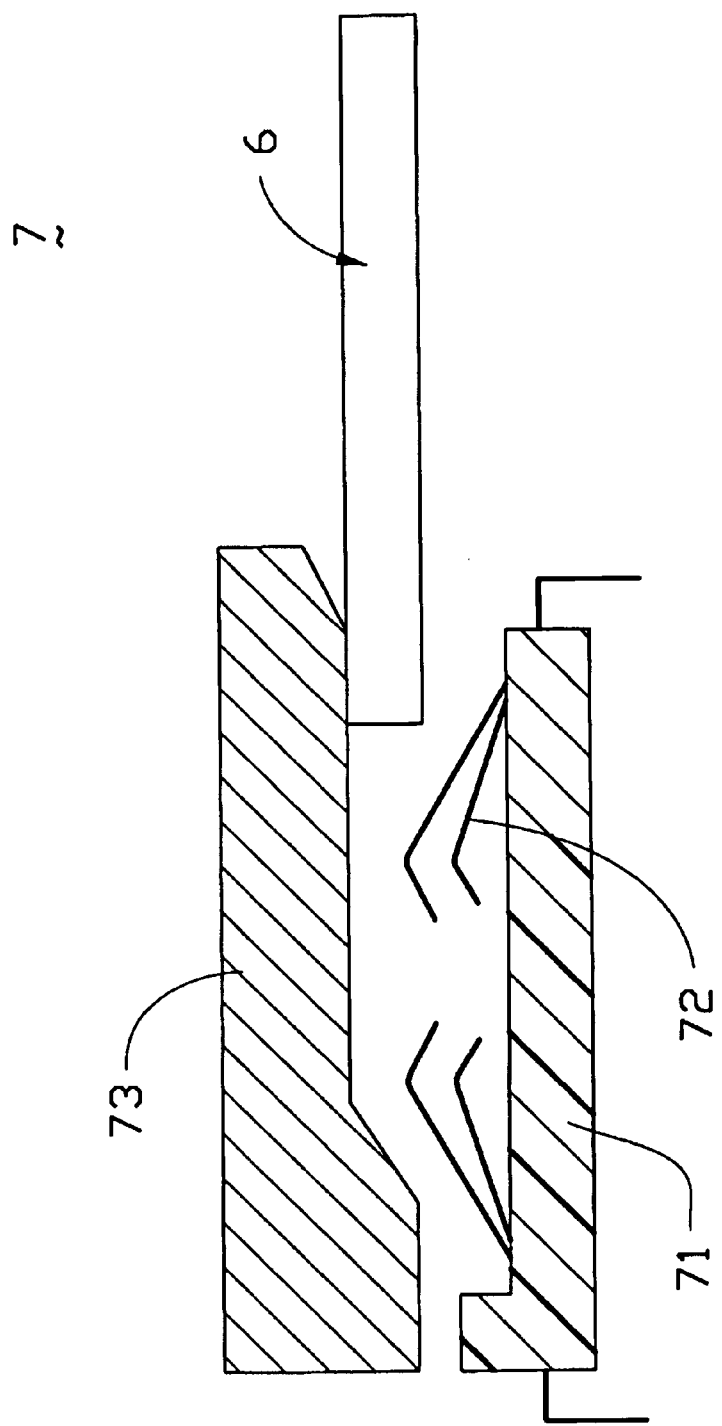
FIG. 4 is a front view of a conventional electrical card with an upper lid assembled thereto.

Referring to FIGS. 1, 2 and 3A, an electrical connector 1 in accordance with the present invention comprises a base 2 including a frame 20 for providing a supporting face (not labeled) to an inserted memory card 6. The base 2 defines a front face 201 and a rear face 202 opposite the front face 201. The base 2 further forms a pair of side walls 21 on transversal ends thereof. The base 2 further defines two openings 22 and a plurality of terminal cells 23 is defined therebetween. A pair of arms 24 extends outward from the rear face 202 and defines a space 25 in which a switching device 5 is installed. A recess 212 is defined in a bottom face thereof. Stoppers 24a are formed on the arms 24 for limiting horizontal movement of the inserted memory card 6.

Terminals 3 are received in terminal cells 23 of the base 2. Each terminal 3 forms a tail end 31 for soldering to a printed circuit board (not shown). Each terminal 3 further forms a connecting arm 32 extending upward for electrically connecting with a conductive pads of the memory card 6. Each terminal 3 forms a retaining portion 33 for interferential engagement with inner walls of the terminal cell 23 such that the tail end 31 and the connecting arm 32 can be correctly positioned.

The switching device 5 is received in the space 25 defined by the arms 24. The switching device 5 includes upper and lower switching members 51 and 52. Both upper and lower switching members 51, 52 include an anchoring portion 511, 521 for assembly to an upper face of the frame 20. Each switching member 51 (52) includes a solder tail 512 (522) soldered to the printed circuit board. Each switching member 51 (52) further forms a contact portion 513 (523). The upper switching member 51 further forms a biasing hump 514 for engagement with a leading edge of the memory card 6. When the upper and lower switching members 51, 52 are assembled to the base 2, the contact portions 513, 523 are spaced apart from each other before the memory card 6 is inserted. The biasing hump 514 projects into an inserting path of the memory card 6—i.e. projecting over the supporting face (not labeled) of the frame 20. The upper and lower switching members 51, 52 are arranged in juxtaposition but the upper contact portion 513 is located above the lower contact portion 523 in alignment with each other. The contact portion 513 of the upper switching member 51 is limited by a corresponding stopper 24a of the switching member 51.

Panels 4 are assembled to the side walls 21 of the frame 20. The panel 4 has an upright cross section for closely mating with the side wall 21. A guiding panel 41 of the panel 4 extends over a top end 211 of the side wall 21 defines a guiding slot (not labeled) between the guiding panel 41 and the supporting face (not labeled). A retaining panel 42 extends parallel to the guiding panel 41 defining a retaining slot therebetween. The retaining panel 42 forms a pair of lugs 43 for engaging with the recess 221 under the side wall 21. By this arrangement, when the panel 4 is assembled to the frame 20, the guiding slot defined provides an entrance to the memory card 6.

In addition, the opening 22 defined in the frame 20 provide a robust space for receiving other electrical components mounted on the printed circuit board. In addition, the panel 4 is made from metal and extends directly toward the base 2. As a result, the height of the connector 1 is therefore reduced and the material cost is also lowered accordingly.

Referring to FIGS. 3A to 3D, the memory card 6 is inserted into the guiding slot defined by the panels 4 and the frame 20 from the inserting face 201. The span between the side walls 21 equals approximately to the width of the memory card 6 thereby limiting as well as guiding the memory card 6 to a final position in which an electrical engagement between the memory card 6 and the connector 1 is achieved. During the insertion of the memory card 6, the memory card 6 slides over the contacting arms 32 of the terminals 3 and pushes them downward. The connecting arms 32 of the terminals 3 abut against conductive pads (not shown) under the memory card 6 thereby pushing the memory card 6 against the guiding panel 41 of the panel 4. By this arrangement, the memory card 6 is correctly positioned within the connector 1.

Before the memory card 6 reaches to its final position, a leading edge of the memory card 6 slides over the biasing hump 514 of the upper switching member 51 thereby pushing the contact portion 513 to engage the contact portion 523 of the lower switching member 52 to establish an electrical contact therebetween. Because the biasing bump 514 of the upper switching member 51 projects over the supporting face of the frame 20, it can be easily triggered by the leading edge of the memory card 6 thereby increasing the reliability of the switching device 5.

While the present invention has been described with reference to specific embodiment, the description is illustrative of the invention and is not to be construed as limiting the invention. Various modifications to the present invention can be made to the preferred embodiment by those skilled in the art without departing from the true spirit and scope of the invention as defined by the appended claims.

I claim:

1. An electrical connector for electrical interconnection between a card apparatus and a circuit board, comprising:

a base having a front surface for entrance of an insertion of the card apparatus to the electrical connector, a rear surface for termination of the insertion of the card apparatus to the electrical connector, a supporting surface for supporting the card apparatus located therebetween and defining a plurality of terminal cells therein, and a receiving space for reception of the card apparatus therein defined above the supporting surface, a pair of arms extending beyond the rear surface of the base and forming a stopper thereof for limiting further movement of the card apparatus, the arms further defining a space defined therebetween;

a plurality of conductive terminals, each of said terminals disposed within a corresponding terminal cell of the base, each of said terminals having a connecting arm protruding into the receiving space for contact with the card apparatus; and a switching device disposed within said space defined between the arms of said base, including first and second switching members for electrically contacting with different circuits on the circuit board, each of said switching members respectively forming a first contact portion and a second contact portion spaced apart from each other before the insertion of the card apparatus, wherein the first contact portion of the first switching member abuts against a bottom of the stopper before the card apparatus is inserted.

2. The electrical connector as described in the claim 1, wherein two side walls are respectively located on opposite ends of the base and the receiving space is defined therebetween.

3. The electrical connector as described in the claim 1, wherein the first switching member of the switching device further includes a biasing hump projecting into a path of the inserted card apparatus.

4. The electrical connector as described in the claim 1, wherein the first and second switching members further respectively include a retaining section for fixedly assembly to the base, and a soldering section for electrical contact with the corresponding circuit of the circuit board.

5. The electrical connector as described in the claim 1, wherein the first and second switching members are arranged in juxtaposition but the first contact portion is located above the second contact portion in alignment.

6. An electrical connector for electrical interconnection between a card apparatus and a circuit board, comprising:

a base having a front surface for entrance of an insertion of the card apparatus to the electrical connector, a rear surface for termination of the insertion of the card apparatus and a receiving space formed above a supporting surface for reception of the card apparatus therein, a pair of arms extending beyond the rear surface of the base and forming a stopper thereof for limiting further movement of the card apparatus, the arms further defining a space defined therebetween;

a plurality of conductive terminals, each of said terminals having a connecting arm protruding into the receiving space for contact with the card apparatus; and a switching device disposed within said space defined between the arms of said base, including a first and second switching members electrically contacting with different circuits on the circuit board and respectively forming a first contact portion and a second contact portion spaced apart from each other before the insertion of the card apparatus, whereby the first switching member is resiliently downwardly depressed by the card apparatus to act the first contact portion thereof to electrically contact with the second contact portion of the second switching member for attaching an electrical connection between the card apparatus and the circuit board as soon as the card apparatus inserts and reaches to the rear surface of the base wherein the inserted card apparatus is positioned above both the first and second switching member.

* * * * *